(12) United States Patent
Sawada et al.

(10) Patent No.: US 8,396,635 B2
(45) Date of Patent: Mar. 12, 2013

(54) CONTROL APPARATUS FOR MULTI-SPEED AUTOMATIC TRANSMISSION

(75) Inventors: Hiroyuki Sawada, Okazaki (JP); Hitoshi Matsunaga, Anjo (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 341 days.

(21) Appl. No.: 12/754,688

(22) Filed: Apr. 6, 2010

(65) Prior Publication Data

US 2010/0262345 A1    Oct. 14, 2010

(30) Foreign Application Priority Data

Apr. 8, 2009  (JP) ................................ 2009-093766

(51) Int. Cl.
*G06F 7/00*    (2006.01)
(52) U.S. Cl. ......................................................... 701/58
(58) Field of Classification Search .................. 701/58
See application file for complete search history.

(56) References Cited

FOREIGN PATENT DOCUMENTS

| JP | 2006258125 A | * | 9/2006 |
| JP | 200811510 A | * | 5/2008 |
| JP | 2008111510 A | | 5/2008 |

* cited by examiner

*Primary Examiner* — Thomas Tarcza
*Assistant Examiner* — Maceeh Anwari
(74) *Attorney, Agent, or Firm* — Gifford, Krass, Sprinkle, Anderson & Citkowski, P.C.

(57) ABSTRACT

A control apparatus for a multi-speed automatic transmission which is equipped with a manual shift mode that allows a speed step to be shifted up or down manually by an operation of a driver of the vehicle is provided. The control apparatus permits a downshift to be manually performed, provided that during the manual mode, one of vehicle speed, engine rotation speed, and turbine rotation speed of the multi-speed automatic transmission is less than or equal to a downshift permission criterion value that is set according to the speed step achieved by the downshift. The control apparatus corrects the downshift permission criterion value by a speed-value-increasing correction amount that is computed according to the situation of travel of the vehicle. The control apparatus includes a speed-value-increasing correction amount computation portion that computes the speed-value-increasing correction amount separately for each of numbers of steps over which downshifts occur.

8 Claims, 4 Drawing Sheets

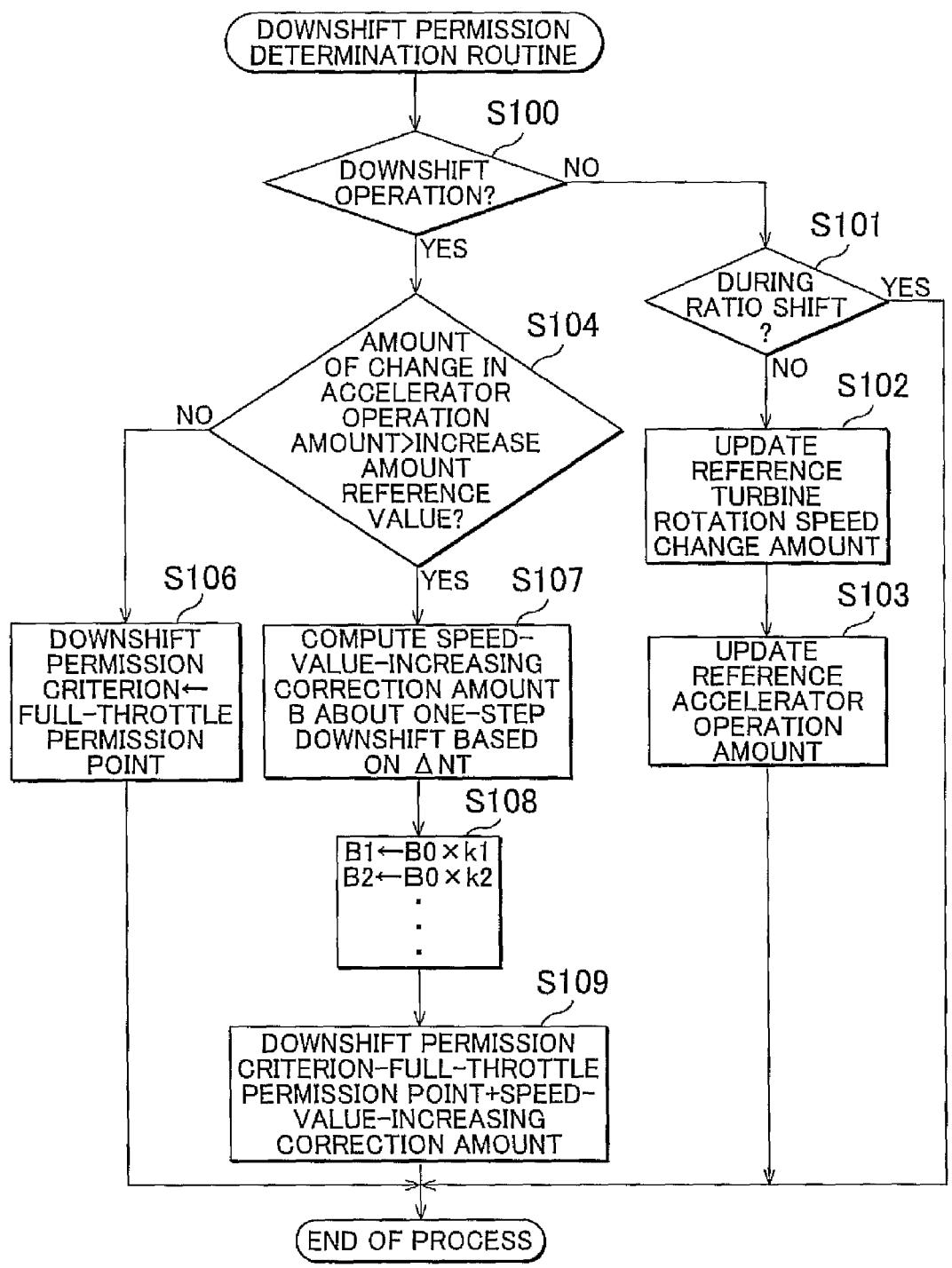

CONTROL APPARATUS FOR MULTI-SPEED AUTOMATIC TRANSMISSION

INCORPORATION BY REFERENCE

The disclosure of Japanese Patent Application No. 2009-093766 filed on Apr. 8, 2009, including the specification, drawings and abstract is incorporated herein by reference in its entirety.

BACKGROUND OF THE INVENTION

1. Field of Invention

The invention relates to a control apparatus for a multi-speed automatic transmission which is equipped with a manual shift mode that allows the speed ratio step to be shifted up or down manually by an operation of a driver of the vehicle.

2. Description of Related Art

There is a multi-speed automatic transmission of a vehicle that is able to switch between an automatic shift mode in which an appropriate speed ratio step is automatically set on the basis of the state of travel of the vehicle and a manual shift mode that allows the speed ratio step to be shifted up or down manually by an operation of a driver of the vehicle. During the manual shift mode of this multi-speed automatic transmission, the speed ratio step of the multi-speed automatic transmission is set, in principle, according to the operation of the driver. However, this automatic transmission is designed so that the downshift operation by the driver is cancelled in the case where the engine rotation speed becomes excessively high due to a rise in the turbine rotation speed after the downshift. For example, Japanese Patent Application Publication No. 2008-111510 (JP-A-2008-111510) discloses a control apparatus for a multi-speed automatic transmission that cancels a driver's downshift operation when the vehicle speed exceeds a downshift-permitting vehicle speed that is set at a vehicle speed that is lower than an automatic upshift vehicle speed. Incidentally, the determination regarding the permission of a downshift is based on not only the vehicle speed, but also the engine rotation speed, or the turbine rotation speed of the multi-speed automatic transmission.

Besides, a control apparatus for a multi-speed automatic transmission which performs a control of increasing a downshift permission criterion value with regard to the vehicle speed, the engine rotation speed, or the turbine rotation speed of the multi-speed automatic transmission, is also known. In this control apparatus, the downshift permission criterion value set according to the speed ratio step brought about by a downshift is corrected with a speed-value-increasing correction amount that is computed according to the situation of travel of the vehicle at the time of start of the downshift. In this manner, the control apparatus variably sets the downshift permission criterion value according to the situation of travel of the vehicle. When the depression of the accelerator pedal is small and therefore the rising of the engine rotation speed before a downshift is completed is slow, the downshift permission criterion value is adjusted to a higher speed value (a higher vehicle speed value, a higher rotation speed value), so as to reduce the cancellation of a manual downshift. As a control apparatus for a multi-speed automatic transmission of this kind, Japanese Patent Application Publication No. 2006-258125 (JP-A-2006-258125), for example, discloses a control apparatus that cancels the downshift operation of a driver when the engine rotation speed exceeds a downshift permission criterion value, and that adjusts the downshift permission criterion value to a higher speed value when the degree of deceleration of the vehicle is great.

By the way, a downshift over a plurality of steps, that is, a downshift that passes at least one speed ratio step, may sometimes be required depending on a driver's operation. Then, depending on the numbers of steps of downshifts, the gear ratios of the multi-speed automatic transmission achieved by the downshifts vary, and therefore the amounts of change in the turbine rotation speed achieved by the downshifts also vary even if the accelerator operation amount is fixed. In the foregoing control apparatuses for multi-speed automatic transmissions according to the related art, however, the speed-value-increasing correction amount is computed in a uniform manner regardless of the number of steps of a downshift. Therefore, with the foregoing control apparatuses, it sometimes happens that at the time of a downshift that occurs over a plurality of steps, the correction of the downshift permission criterion value becomes excessive, so that after the downshift, an upshift immediately needs to be performed, or after the downshift, excessively high engine rotation speed occurs.

SUMMARY OF THE INVENTION

The invention provides a control apparatus for a multi-speed automatic transmission that is capable of appropriately performing a control of adjusting the downshift permission criterion value to a higher speed value even at the time of a downshift that occurs over a plurality of steps, that is, a downshift that passes at least one speed ratio step.

A first aspect of the invention relates to a control apparatus for a multi-speed automatic transmission. This control apparatus is equipped with a manual shift mode that allows a speed step to be shifted up or down manually by an operation of a driver of a vehicle. The control apparatus permits a downshift to be manually performed, on a condition that during the manual mode, one of vehicle speed, engine rotation speed, and turbine rotation speed of the multi-speed automatic transmission is less than or equal to a downshift permission criterion value that is set according to the speed step achieved by the downshift, and corrects the downshift permission criterion value by a speed-value-increasing correction amount that is computed according to a situation of travel of the vehicle. The apparatus includes a speed-value-increasing correction amount computation portion that computes the speed-value-increasing correction amount separately for each of numbers of steps over which downshifts occur.

According to the foregoing construction, even when a downshift over a plurality of steps is to be performed, an appropriate speed-value-increasing correction amount is set according to the number of steps over which the downshift is performed, so that it is possible to appropriately perform the increasing of the downshift permission criterion value in terms of speed, specifically, one of the vehicle speed, the engine rotation speed, and the turbine rotation speed of the multi-speed automatic transmission.

BRIEF DESCRIPTION OF THE DRAWINGS

The foregoing and further features and advantages of the invention will become apparent from the following description of preferred embodiments with reference to the accompanying drawings, wherein like numerals are used to represent like elements and wherein:

FIG. 4 is a flowchart of a downshift permission determination routine adopted in the embodiment.

DETAILED DESCRIPTION OF EMBODIMENTS

An embodiment of the control apparatus for a multi-speed automatic transmission of the invention will be described in detail hereinafter with reference to FIG. 1 to FIG. 4. In a vehicle in which the control apparatus of this embodiment is mounted, the multi-speed automatic transmission is equipped with two operation modes, that is, an automatic shift mode in which an appropriate speed ratio step is automatically set on the basis of the state of travel of the vehicle and a manual shift mode that allows the speed ratio step to be shifted up or down manually by an operation of a driver of the vehicle, and the speed shift mode can be switched between these two modes by the driver's operation.

Figure 1:
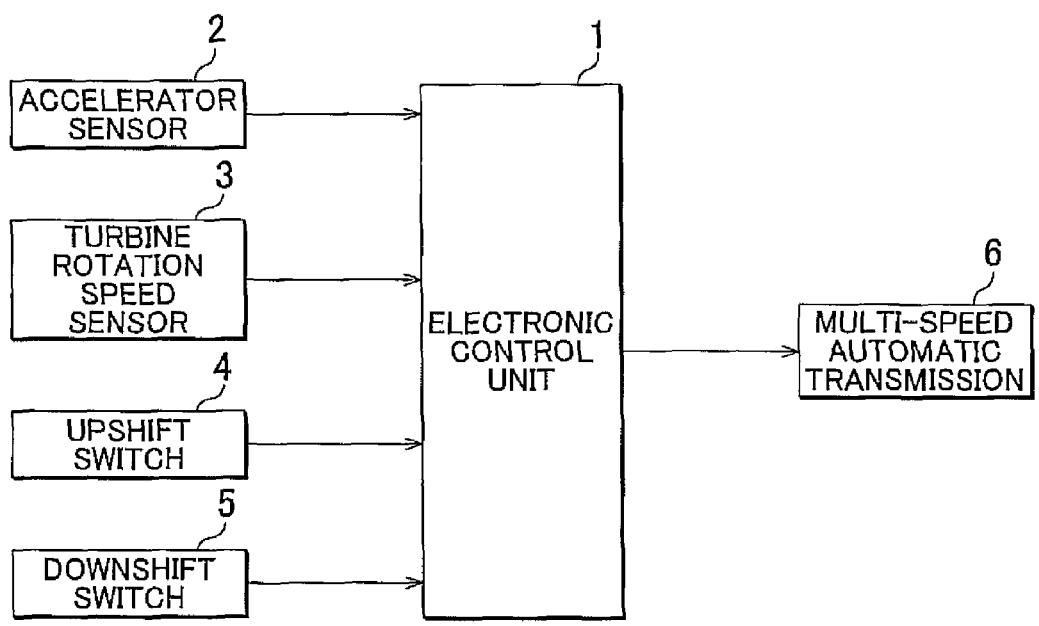
FIG. 1 is a schematic diagram showing an overall construction of a control apparatus for a multi-speed automatic transmission in accordance with an embodiment of the invention.

FIG. 1 is an overall structure of a control apparatus for a multi-speed automatic transmission in accordance with the embodiment. As shown in FIG. 1, the control apparatus of this embodiment is constructed of an electronic control unit 1 as a central component which performs the ratio shift control of a multi-speed automatic transmission that is mounted in a vehicle. The electronic control unit 1 includes a central processing unit (CPU) that carries out various computation processes related to the speed ratio shift control, a read-only memory (ROM) in which programs and data for controls are stored, a random access memory (RAM) that temporarily stores results of computations of the CPU, and the like, and input and output ports for sending signals to and receiving signals from external devices.

Detection signals from various sensors and the like for detecting the situation of travel of the vehicle are input to the electronic control unit 1. The signals input to the electronic control unit 1 are, for example, signals from an accelerator sensor 2 that detects the amount of accelerator operation performed by a driver, a turbine rotation speed sensor 3 that detects the turbine rotation speed (input rotation speed) of a multi-speed automatic transmission 6, an upshift switch 4 and a downshift switch 5 that detect the driver's upshift and downshift operations during the manual shift mode, etc. The electronic control unit 1 carries out a ratio shift control of the multi-speed automatic transmission 6 by outputting command signals according to the situation of travel of the vehicle that is determined on the basis of signals from various sensors and the like.

In this embodiment, during the manual shift mode, one of speed ratio steps of the multi-speed automatic transmission is set, in principle, in accordance with operation performed by a driver. However, in the case where the rise in the turbine rotation speed following a downshift will cause excessively high rotation speed of the engine, the electronic control unit 1 cancels the effect of the driver's downshift operation.

In this embodiment, the determination as to whether to permit or cancel a downshift based on a driver's operation is made on the basis of the turbine rotation speed of the multi-speed automatic transmission. More concretely, this determination is made as follows. If the turbine rotation speed of the multi-speed automatic transmission is less than or equal to a downshift permission criterion value, the implementation of the downshift is permitted, whereas if the downshift permission criterion value is exceeded, the implementation of the downshift is cancelled or prohibited.

Besides, in this embodiment, a speed-value-increasing control, that is, a control of adjusting the downshift permission criterion value to a higher speed value, is performed. This speed-value-increasing control variably sets the downshift permission criterion value according to the situation of travel of the vehicle by correcting the downshift permission criterion value for a downshift through the use of a speed-value-increasing correction amount that is computed according to the situation of travel of the vehicle at the time of start of the downshift. For example, when the depression of an accelerator pedal is small and therefore the rising of the engine rotation speed before the downshift is completed is slow, the downshift permission criterion value is adjusted to a higher speed value (a higher rotation speed value), so as to reduce the cancellation of a manual downshift.

By the way, a downshift over a plurality of steps, that is, a downshift that passes at least one speed ratio step, is sometimes required depending on operation of a driver. Then, depending on the number of ratio steps of downshifts, the gear ratios of the multi-speed automatic transmission achieved by the downshifts vary, and therefore the amounts of change in the turbine rotation speed following the downshifts also vary even if the accelerator operation amount is fixed. Therefore, in this embodiment, downshift permission criterion values as mentioned above are set separately for the individual numbers of steps of the downshifts. For example, with regard to the downshifts from a state of traveling at the sixth speed in the six-speed range, a permission criterion value regarding the downshift from the fifth speed to the fourth speed and a permission criterion value regarding the downshift from the fourth speed to the third speed are set as well as a permission criterion value regarding the downshift from the sixth speed to the fifth speed.

Figure 2:
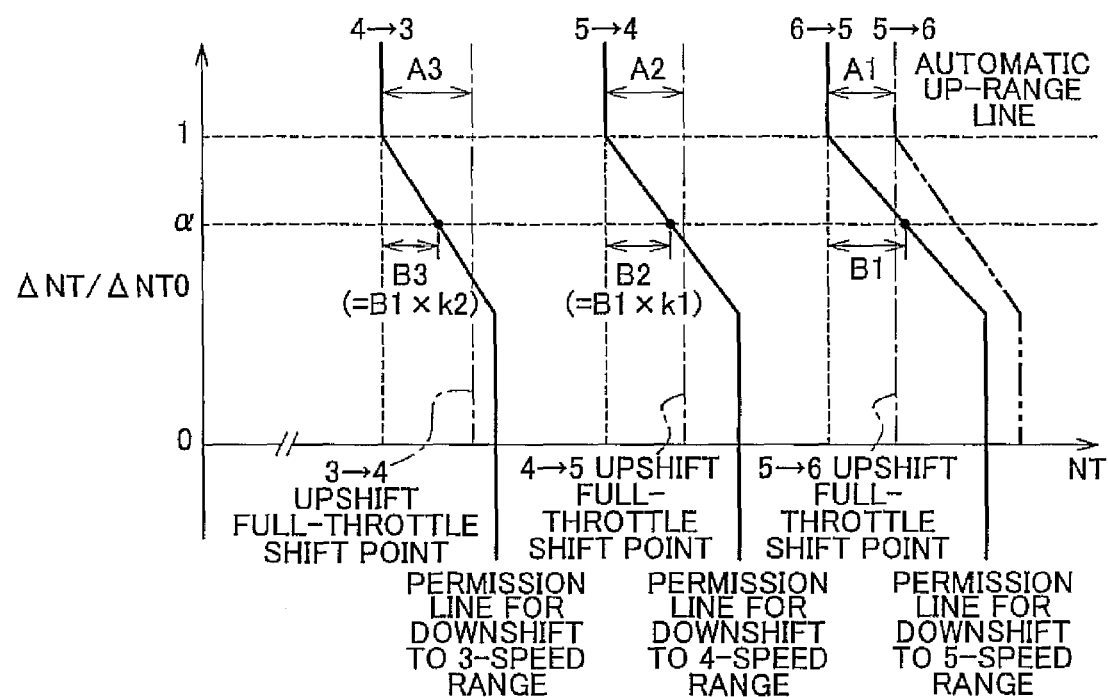
FIG. 2 is a diagram showing a manner of setting a downshift permission criterion value in the embodiment.

Such setting of downshift permission criterion values in this embodiment will be described with reference to FIG. 2. The diagram of FIG. 2 shows the manner of setting downshift permission criterion values for downshifts from the state of traveling at the sixth speed in the six-speed range.

To set downshift permission criterion values, firstly the upshift full-throttle shift point for the present speed ratio step is referred to; for example, the upshift full-throttle shift point from the fifth speed to the sixth speed is referred to in the case of the downshift from the six-speed-range sixth-speed traveling state. An upshift full-throttle shift point shows a turbine rotation speed at which an automatic upshift (up-range) is performed in order to prevent excessively high engine rotation speed. The values of the upshift full-throttle shift points are stored in the ROM of the electronic control unit 1. Then, the upshift full-throttle shift points for speed ratio steps that are below the present speed ratio step, that is, the upshift full-throttle shift point for the shift from the fourth speed to the fifth speed and the upshift full-throttle shift point for the shift from the third speed to the fourth speed in the example shown in FIG. 2, are calculated by converting the upshift full-throttle shift point for the present speed ratio step according to the gear ratios.

Subsequently, from the calculated upshift full-throttle shift points, full-throttle downshift permission points separately for the individual numbers of steps of the downshifts are calculated. A full-throttle downshift permission point shows the upper limit value of turbine rotation speed at which a given downshift can be carried out in the full-throttle state without resulting in excessive engine rotation speed. The full-throttle downshift permission point from a speed ratio step $(x+1)$ to a speed ratio step x is calculated by subtracting a corresponding one of constants that are set separately for individual speed ratio steps, from the value of the upshift full-throttle shift point from the speed ratio step x to the speed ratio step (x+1). Incidentally, the values of the constants are set so that the lower a speed step, the higher the value set for the speed step. In the example shown in FIG. 2, the full-throttle downshift permission point from the sixth speed to the fifth speed is calculated as a value obtained by subtracting a constant A1 from the upshift full-throttle shift point from the fifth speed to the sixth speed, and the full-throttle downshift permission point from the fifth speed to the fourth speed is calculated as a value obtained by subtracting a constant A2 from the upshift full-throttle shift point from the fourth speed to the fifth speed. Furthermore, the full-throttle downshift permission point from the fourth speed to the third speed is calculated as a value obtained by subtracting a constant A3 from the upshift full-throttle shift point from the third speed to the fourth speed.

After the full-throttle downshift permission point is calculated in the foregoing manner, speed-value-increasing correction amounts regarding the individual downshift patterns are calculated. Firstly, a speed-value-increasing correction amount regarding the downshift from the present speed ratio step to the immediately subsequent speed ratio step (a one-step downshift) is calculated on the basis of the amount of change $\Delta NT$ in turbine rotation speed (the turbine rotation speed change amount $\Delta NT$) (more precisely, the ratio of the amount of change in the turbine rotation speed (the turbine rotation speed change amount) $\Delta NT$ at the time of start of the shift to the turbine rotation speed change amount $\Delta NT0$ at the time of full throttle ($\Delta NT/\Delta NT0$)). In the example shown in FIG. 2, the speed-value-increasing correction amount B1 regarding the downshift from the sixth speed to the fifth speed is calculated on the basis of the ratio ($\Delta NT/\Delta NT0$) of the shift-start-time turbine rotation speed change amount $\Delta NT$ to the full-throttle-time turbine rotation speed change amount $\Delta NT0$.

After the speed-value-increasing correction amount about the one-step downshift is calculated in the foregoing manner, speed-value-increasing correction values about the subsequent speed ratio steps (downshifts over two or more steps) are each calculated by multiplying the calculated speed-value-increasing correction amount about the one-step downshift by a corresponding one of coefficients that are set for the individual downshift patterns. Incidentally, the coefficient that is used in the multiplication for a given two-or-more-step downshift from the sixth speed is set at a ratio of the gear ratio of the multi-speed automatic transmission achieved by the two-or-more-step downshift to the gear ratio of the multi-speed automatic transmission achieved by the one-step downshift. Thus, the values of the coefficients for the downshifts are set so that the set values progressively decrease as the numbers of steps of the downshifts increase. For example, in the example shown in FIG. 2, the speed-value-increasing correction mount B2 about the downshift from the fifth speed to the fourth speed is calculated as a value obtained by multiplying the speed-value-increasing correction amount B1 about the downshift from the sixth speed to the fifth speed by a coefficient k1, and the speed-value-increasing correction amount B3 about the downshift from the fourth speed to the third speed is calculated as a value obtained by multiplying the speed-value-increasing correction amount B1 by a coefficient k2(<k2).

Incidentally, in the diagram of FIG. 2, downshift permission lines representing the transitions of the speed-value-increasing correction amounts B1, B2 and B3 for the downshifts with respect to the ratio of the shift-start-time turbine rotation speed change amount $\Delta NT$ to the full-throttle-time turbine rotation speed change amount $\Delta NT0$ are shown by solid lines.

Thus, in this embodiment, since the speed-value-increasing correction amounts about the downshifts are computed individually for the numbers of steps of downshifts, the speed-value-increasing correction amount is variably set according to the number of steps of a downshift even if the downshift occurs over a plurality of steps. Besides, in this embodiment, the speed-value-increasing correction amounts about the one-step downshifts are computed according to the situation of travel of the vehicle (the turbine rotation speed change amount $\Delta NT$), and the speed-value-increasing correction amounts about the two-or-more-step downshifts are each computed by multiplying the speed-value-increasing correction amount about the one-step downshift by the corresponding coefficient. The coefficients used in the multiplications are set so that the set coefficients decease as the numbers of steps of the downshifts increase, through the use of the ratios of the gear ratio of the multi-speed automatic transmission achieved by the one-step downshift to the gear ratios of the multi-speed automatic transmission achieved by the downshifts by two or more steps. Thus, in this embodiment, the speed-value-increasing correction amounts about the downshifts from the present speed ratio step to speed ratio steps that are lower by two or more steps than the present speed ratio step are computed simultaneously with the computation of a speed-value-increasing correction amount about the downshift from the present speed ratio step to the immediately subsequent speed ratio step.

Incidentally, in this embodiment, after the speed-value-increasing correction amounts about the downshifts to the various speed ratio steps are calculated, the foregoing downshift-permitting values about the downshifts to the various speed ratio steps are calculated by correcting each full-throttle downshift permission point with a corresponding one of the calculated speed-value-increasing correction amounts.

By the way, if the accelerator pedal is further depressed after a downshift starts, the post-downshift engine rotation speed becomes higher than the engine rotation speed expected from the turbine rotation speed change amount $\Delta NT$ at the time of start of the shift. Therefore, if the downshift permission criterion value is corrected on the basis of the speed-value-increasing correction amount that is computed according to the turbine rotation speed change amount $\Delta NT$ occurring at the time of start of the downshift, it sometimes happens that after the downshift, an upshift is immediately needed, or that after the downshift, excessively high engine rotation speed occurs.

Figure 3:
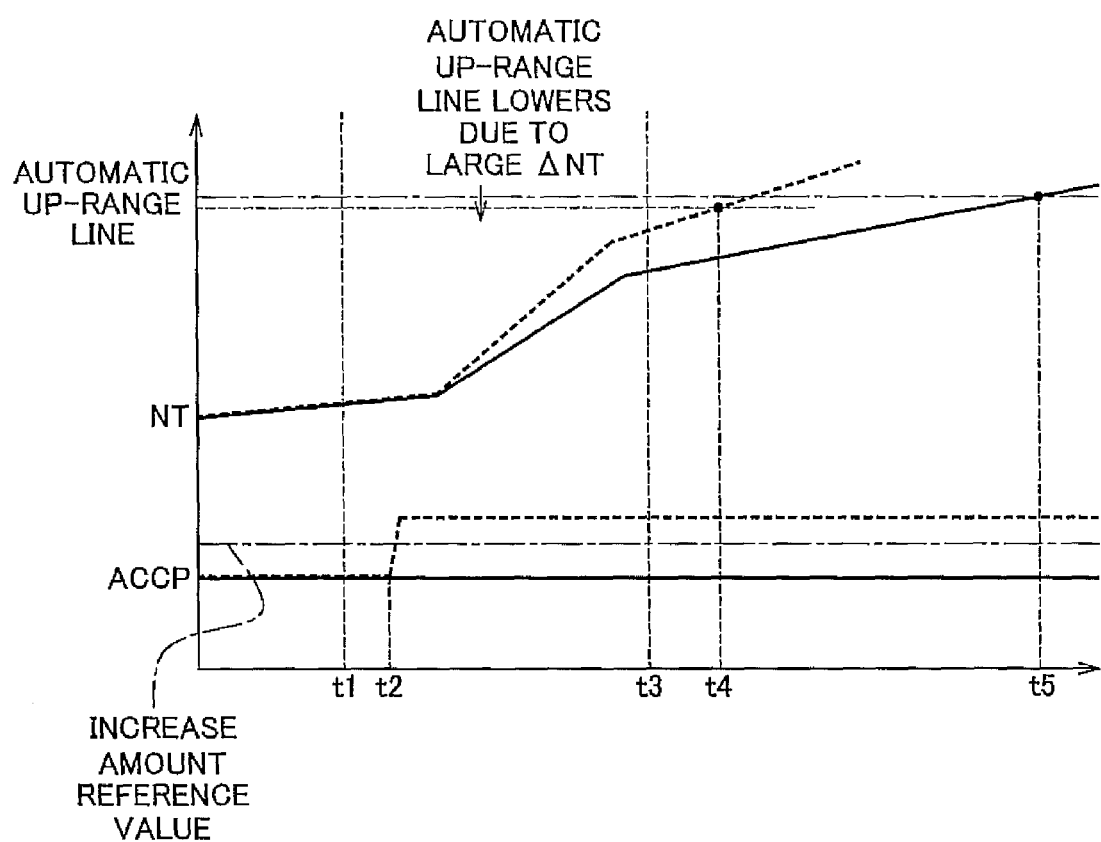
FIG. 3 is a time chart showing an example of a manner of control before and after a downshift in the control apparatus of the embodiment.

This will be described with reference to FIG. 3. In FIG. 3, transition of the accelerator operation amount ACCP and transition of the turbine rotation speed NT when a downshift operation is performed while the amount of depression of the accelerator pedal is constant are shown by solid lines, and transition of the accelerator operation amount ACCP and transition of the turbine rotation speed NT when the accelerator pedal is further depressed after a downshift starts are shown by dotted lines. Incidentally, in FIG. 3, a downshift is started at time t1, and the downshift ends at time t3.

In the case where the depression of the accelerator pedal is constant, the rising of the turbine rotation speed is gentle, so that after the downshift ends at time t3, the turbine rotation speed NT remains below an automatic upshift (up-range) point until time t5 that is some time after the time t3. Thus, a plenty of time is provided from the end of the downshift till the performance of an automatic upshift (up-range).

On the other hand, if the accelerator pedal is further depressed at time t2 as shown by the dotted line in FIG. 3, the rising of the turbine rotation speed NT becomes sharp and the turbine rotation speed change amount ΔNT becomes large, so that the automatic upshift (up-range) point lowers. As a result, the turbine rotation speed NT exceeds the automatic upshift point at time t4 immediately after the downshift ends at time t3. Therefore, in this case, the downshift is immediately followed by performance of an upshift, so that the driver perceives a busy feeling.

Therefore, in this embodiment, if the amount of increase in the accelerator operation amount ACCP following a downshift exceeds a prescribed reference value of the amount of increase, the downshift permission criterion value is changed to a value (=full-throttle downshift permission point) that is computed without performing the correction by the speed-value-increasing correction amount. Therefore, even when the accelerator pedal is further depressed after a downshift starts, the occurrence of an upshift or excessively high engine rotation immediately following the downshift is substantially prevented. Incidentally, in the case where the downshift permission criterion value is changed in this manner, it is possible to increase the downshift permission criterion value without taking into account the further depression of the accelerator pedal subsequent to the start of a downshift, so that further increase of the downshift permission criterion value in terms of the turbine rotation speed or the like is allowed. Thus, it becomes possible to expand the opportunities when a downshift is carried out precisely corresponding to operation of a driver.

FIG. 4 is a flowchart showing a downshift permission determination routine regarding the determination about permission of a downshift in this embodiment. The process of this routine is repeatedly executed periodically by the electronic control unit 1 while the vehicle is traveling.

When the process of the routine starts, the electronic control unit 1 determines whether or not there has been a manual downshift operation performed by a driver. If there is no downshift operation (NO in S100), the electronic control unit 1 checks whether or not a gear ratio shift is being performed in step S101. If a gear ratio shift is not being performed (NO in S101), the electronic control unit 1 updates a reference turbine rotation speed change amount and a reference accelerator operation amount to values that correspond to the present situation in step S102 and step S103. To that end, the reference turbine rotation speed and the reference accelerator operation amount during a gear ratio shift are set at the values of the turbine rotation speed and the accelerator operation amount occurring immediately prior to the start of the gear ratio shift, respectively.

On the other hand, if there has been an operation for shift-down (YES in S100), the electronic control unit 1 subsequently determines in step S104 whether or not the amount of change in the accelerator operation amount occurring following the gear ratio shift is grater than a prescribed increase amount reference value. If the amount of change in the acceleration operation amount is greater than the increase amount reference value (YES in S104), the electronic control unit 1, in step S106, sets the downshift permission criterion values about the individual downshifts to the corresponding full-throttle downshift permission points, and then ends the present process of this routine.

If it is determined in step S104 that the amount of change in the accelerator operation amount is not greater than the prescribed increase amount reference value (NO in S104), the electronic control unit 1 computes in step S107 the speed-value-increasing correction amount B0 about the downshift from the present speed ratio step to the immediately subsequent speed ratio step on the basis of a reference turbine rotation speed change amount ΔNT. Besides, in step S108, the electronic control unit 1 computes speed-value-increasing correction amounts B1, B2 . . . about the downshifts from the present speed ratio step to the speed ratio steps that are two or more steps down from the present speed ratio step, by multiplying the speed-value-increasing correction amount B0 calculated in step S107 by the coefficients that correspond to the gear ratios of the speed steps. Subsequently in step S109, the electronic control unit 1 sets downshift permission criterion values for the downshifts to the speed ratio steps to the values obtained by correcting the full-throttle downshift permission points of the individual speed ratio steps through the use of the speed-value-increasing correction amounts B0, B1, B2 . . . of the speed ratio steps, respectively.

Incidentally, in this embodiment, the electronic control unit 1 carries out a process as a speed-value-increasing correction amount computation portion in the invention. The control apparatus for the multi-speed automatic transmission of the embodiment described above achieves the following effects.

In this embodiment, during the manual shift mode, a manual downshift is permitted on condition that the turbine rotation speed of the multi-speed automatic transmission 6 is less than or equal to the downshift permission criterion value that is set according to the post-downshift speed ratio step, and the downshift permission criterion value is corrected with the speed-value-increasing correction amount that is computed according to the turbine rotation speed change amount ΔNT occurring at the time of start of the downshift. In this embodiment, the electronic control unit 1 computes speed-value-increasing correction amounts for the downshifts separately for the numbers of steps of the downshifts. More specifically, the electronic control unit 1 computes the speed-value-increasing correction amount about a one-step downshift on the basis of the turbine rotation speed change amount ΔNT occurring at the time of start of the downshift, and computes the speed-value-increasing correction amounts about the downshifts over two or more steps by multiplying the speed-value-increasing correction amount about the one-step downshift by coefficients. Then, as the coefficients for the multiplication, the electronic control unit 1 uses the ratios of the gear ratio of the multi-speed automatic transmission achieved by the one-step downshift to the gear ratios of the multi-speed automatic transmission achieved by the downshifts to the speed steps that are two or more steps down from the present speed step. Therefore, even when a downshift over two or more steps is performed, the increasing of the downshift permission criterion value in terms of a speed, such as the turbine rotation speed or the like, can be appropriately performed since the speed-value-increasing correction amount is variably set according to the number of steps of the downshift.

In this embodiment, the speed-value-increasing correction amount about a downshift is computed by using the value of the turbine rotation speed change amount ΔNT of the multi-speed automatic transmission that occurs at the time of start of the downshift. Therefore, the computation of the speed-value-increasing correction amounts can easily be performed.

In the embodiment, the electronic control unit 1 changes the downshift permission criterion value to a value that is computed without performing the correction by the speed-value-increasing correction amount, when the amount of increase in the accelerator operation amount which occurs after a downshift starts is greater than the prescribed increase amount reference value. When the accelerator pedal is further depressed after a downshift starts, the engine rotation speed subsequent to the downshift becomes higher than that expected from the situation of travel of the vehicle occurring at the time of start of the downshift. Therefore, if the downshift permission criterion value about a downshift is corrected by using the speed-value-increasing correction amount that is corrected according to the situation of travel of the vehicle which occurs at the time of start of the downshift, it sometimes happens that after the downshift, an upshift is immediately needed, or that after the downshift, excessively high engine rotation occurs. In the embodiment, however, if the accelerator pedal is further depressed after a downshift starts, the correction with the speed-value-increasing correction amount is invalidated, so that the occurrence of an upshift or excessively high engine rotation immediately following the downshift can be prevented. Incidentally, in the case where the downshift permission criterion value is changed in this manner, it is possible to increase the downshift permission criterion value without taking into account the further depression of the accelerator pedal subsequent to the start of a downshift, so that further increase of the downshift permission criterion value in terms of the turbine rotation speed or the like is allowed. Thus, it becomes possible to expand the opportunities when a downshift is carried out precisely corresponding to operation of a driver.

The foregoing embodiment can also be carried out with the following modifications. In the foregoing embodiment, when the amount of increase in the accelerator operation amount ACCP after a downshift starts exceeds a prescribed value, the downshift permission criterion value is changed to a value that is computed without performing the correction with the speed-value-increasing correction amount. However, this process can be omitted if the speed-value-increasing correction amount is computed by taking into account the further depression of the accelerator pedal occurring after a downshift starts.

Although in the foregoing embodiment, the computation of the speed-value-increasing correction amount about a downshift is performed by using the turbine rotation speed change amount $\Delta NT$ of the multi-speed automatic transmission occurring at the time of start of the downshift, the computation of the speed-value-increasing correction amount may also be performed on the basis of the turbine rotation speed NT or other parameters, for example, the vehicle speed or the engine rotation speed, or the amount of change in the vehicle speed or the engine rotation speed, etc.

In the foregoing embodiment, the speed-value-increasing correction amounts regarding the downshifts of two or more steps are computed by multiplying the gear ratio of the multi-speed automatic transmission achieved by the one-step downshift by a coefficient that is the ratio of the gear ratio of the multi-speed automatic transmission achieved by the one-step downshift to the gear ratios of the multi-speed automatic transmission achieved by the downshifts to the speed steps that are two or more steps down from the present speed step. However, the foregoing coefficients can be set in other manners as well. For example, appropriate values obtained through experiments, simulation, etc., may be adopted as the values of the foregoing coefficients.

In the foregoing embodiment, the speed-value-increasing correction amount about a given one-step downshift is computed according to the situation of travel of the vehicle, and the speed-value-increasing correction amounts regarding the two-or-more-step downshifts are computed by multiplying the speed-value-increasing correction amount of the one-step downshift by coefficients. However, the manner of computing the speed-value-increasing correction amounts is not limited so, but may be changed arbitrarily. In that case, too, if the speed-value-increasing correction amounts about the downshifts are computed separately for the numbers of steps over which the downshifts are performed, it is possible to appropriately increase the downshift permission criterion value in terms of a speed, such as the turbine rotation speed, even in the case where a downshift over a plurality of steps is performed.

Although in the foregoing embodiment, the determination as to whether or not to permit a downshift is performed on the basis of the turbine rotation speed of the multi-speed automatic transmission, the determination regarding the permission may also be performed on the basis of the vehicle speed or the engine rotation speed. In that case, too, if the setting of the speed-value-increasing correction amounts and the downshift permission criterion values is performed in a manner comparable to that in the forgoing embodiment, substantially the same effects as in the foregoing embodiment can be achieved.

The foregoing embodiment of the invention will be summarized below.

In order to easily perform the computation of the speed-value-increasing correction amounts about downshifts separately for the numbers of steps over which the downshifts are performed, it is appropriate to construct the aforementioned speed-value-increasing correction amount computation portion so as to compute the speed-value-increasing correction amount about a given one-step downshift according to the situation of travel of the vehicle, and compute the speed-value-increasing correction amounts about the two-or-more-step downshifts by multiplying the speed-value-increasing correction amount about the one-step downshift by the corresponding coefficients. It is also appropriate that the coefficient used to multiply the speed-value-increasing correction amount be set smaller the greater the number of steps of the downshift. Furthermore, to easily perform the determination of the coefficients, it is appropriate to use as the coefficients as the ratios of the gear ratio of the multi-speed automatic transmission achieved by the one-step downshift to the gear ratios of the multi-speed automatic transmission achieved by the downshifts to the speed steps that are two or more steps down from the present speed step.

Besides, in order to make easier the computation of the speed-value-increasing correction amounts, it is appropriate to construct the speed-value-increasing correction amount so as to compute the speed-value-increasing correction amounts by using the value of either one of the turbine rotation speed of the multi-speed automatic transmission and the amount of change in the turbine rotation speed occurring at the time of start of the downshift as the situation of travel of the vehicle.

In the case where the accelerator pedal is further depressed after a downshift starts, the engine rotation speed following the downshift becomes higher than that expected from the situation of travel of the vehicle occurring at the time of start of the downshift. Therefore, in that case, if the downshift permission criterion value is corrected by the speed-value-increasing correction amount that is computed according to the situation of travel of the vehicle occurring at the time of start of the downshift, it sometimes happens that after the downshift, an upshift is immediately needed, or that after the downshift, excessively high engine rotation speed occurs. Therefore, if the downshift permission criterion value is changed to a value that is computed without correcting the speed-value-increasing correction amount when the amount of increase in the accelerator operation amount after a downshift starts exceeds the prescribed value, it is possible to prevent the occurrence of an upshift or excessively high engine speed immediately following a downshift. Incidentally, in the case where the downshift permission criterion value is changed in this manner, it is possible to increase the downshift permission criterion value without taking into account the further depression of the accelerator pedal subsequent to the start of a downshift, so that further increase of the downshift permission criterion value in terms of the turbine rotation speed or the like is allowed. Thus, it becomes possible to expand the opportunities when a downshift is carried out precisely corresponding to operation of a driver.

While the invention has been described with reference to example embodiments thereof, it is to be understood that the invention is not limited to the described embodiments or constructions. The invention is intended to cover various modifications and equivalent arrangements. In addition, while the various elements of the disclosed invention are shown in various example combinations and configurations, other combinations and configurations, including more, less or only a single element, are also within the scope of the appended claims.

What is claimed is:

1. A control apparatus for a multi-speed automatic transmission which is capable of selecting a manual shift mode that allows a speed step to be shifted up or down manually by an operation of a driver of a vehicle, the control apparatus comprising:
   an electronic control unit having a manual downshift permission portion, a correction portion, and a speed-value-increasing correction amount computation portion;
   the manual downshift permission portion that permits a downshift to be manually performed, on a condition that while the manual shift mode is selected, one of vehicle speed, engine rotation speed, and turbine rotation speed of the multi-speed automatic transmission is less than or equal to a downshift permission criterion value that is set according to a speed step achieved by the downshift;
   the correction portion that corrects the downshift permission criterion value by a speed-value-increasing correction amount that is computed according to a situation of travel of the vehicle; and
   the speed-value-increasing correction amount computation portion that upon the downshift over more than one number of steps the speed-value-increasing correction amount computation portion computes the speed-value-increasing correction amount separately for each of number of steps over which downshifts occur 2. The control apparatus according to claim 1, wherein the speed-value-increasing correction amount computation portion computes the speed-value-increasing correction amount about a one-step downshift that occurs by one step according to the situation of travel of the vehicle, and computes the speed-value-increasing correction amount about a at-least-two-step downshift that occurs by at least two steps by multiplying the speed-value-increasing correction amount about the one-step downshift by a coefficient.

3. The control apparatus according to claim 2, wherein the speed-value-increasing correction amount computation portion sets the coefficient so that the coefficient about a downshift is smaller if the number of steps of the downshift is larger.

4. The control apparatus according to claim 3, wherein the speed-value-increasing correction amount computation portion uses as the coefficient a ratio of a gear ratio of the multi-speed automatic transmission achieved by the one-step downshift to the gear ratio of the multi-speed automatic transmission achieved by a given downshift.

5. The control apparatus according to claim 1, wherein the speed-value-increasing correction amount computation portion computes the speed-value-increasing correction amount about a downshift by using a value of one of the turbine rotation speed of the multi-speed automatic transmission and amount of change in the turbine rotation speed which occurs when the downshift starts as the situation of travel of the vehicle.

6. The control apparatus according to claim 1, wherein when amount of increase in accelerator operation amount after a downshift starts is greater than a prescribed value, the control apparatus changes the downshift permission criterion value to a value that is computed without performing a correction with the speed-value-increasing correction amount.

7. The control apparatus according to claim 1, wherein the speed-value-increasing correction amount computation portion computes the speed-value-increasing correction amount based on at least one of the vehicle speed, the engine rotation speed, amount of change in the vehicle speed and amount of change in the engine rotation speed as the situation of travel of the vehicle.

8. A control method for a multi-speed automatic transmission which is capable of selecting a manual shift mode that allows a speed step to be shifted up or down manually by an operation of a driver of a vehicle, the control method comprising:
   providing a downshift switch in electronic communication with an electronic control unit, the downshift switch detects a manual downshift operation;
   permitting the downshift to be manually performed, on a condition that while the manual shift mode is selected, one of vehicle speed, engine rotation speed, and turbine rotation speed of the multi-speed automatic transmission is less than or equal to a downshift permission criterion value that is set according to a speed step achieved by the downshift;
   correcting the downshift permission criterion value by a speed-value-increasing correction amount that is computed in the electronic control unit according to a situation of travel of the vehicle; and
   computing the speed-value-increasing correction amount in the electronic control unit upon the downshift over more than one number of steps separately for each of number of steps over which downshifts occur.

* * * * *